Aug. 23, 1932.  C. MURNANE  1,873,458
FARM TRACTOR
Original Filed April 3, 1928   8 Sheets-Sheet 1

Inventor
C. Murnane
By
Atty.

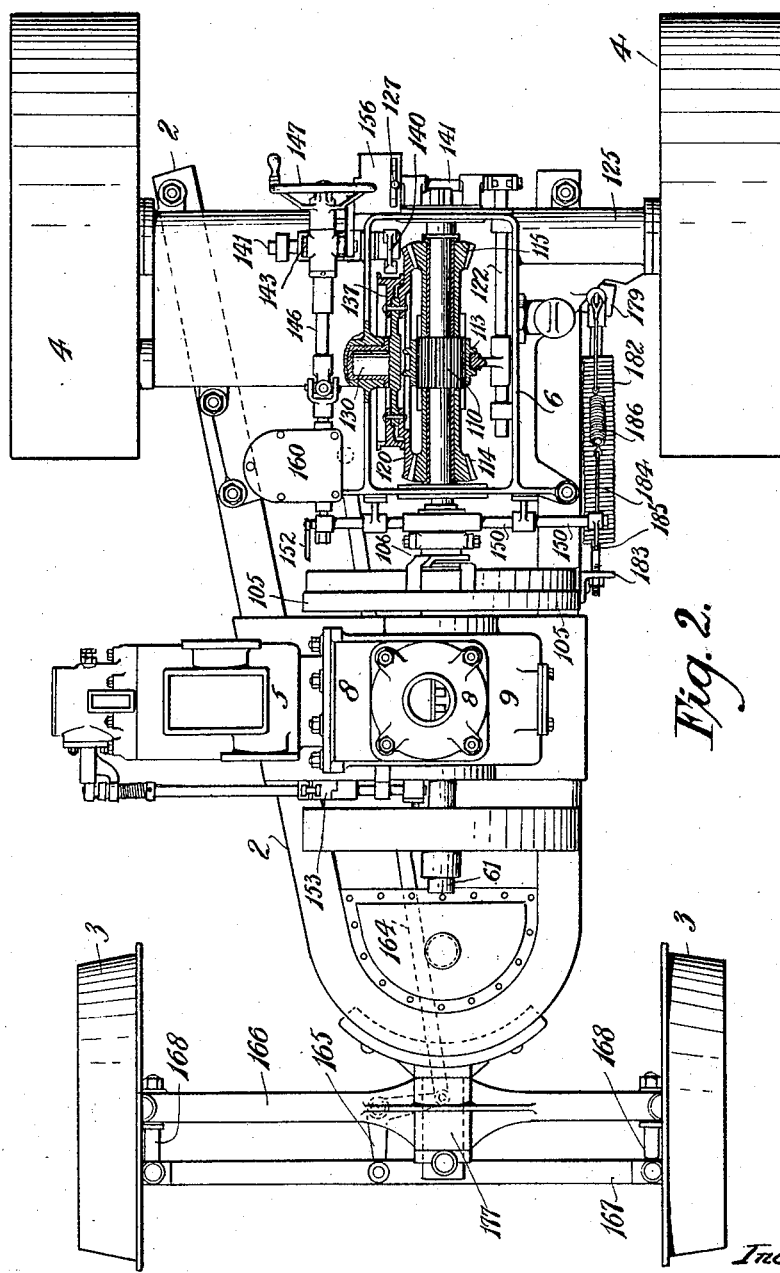

Aug. 23, 1932.  C. MURNANE  1,873,458
FARM TRACTOR
Original Filed April 3, 1928  8 Sheets-Sheet 3

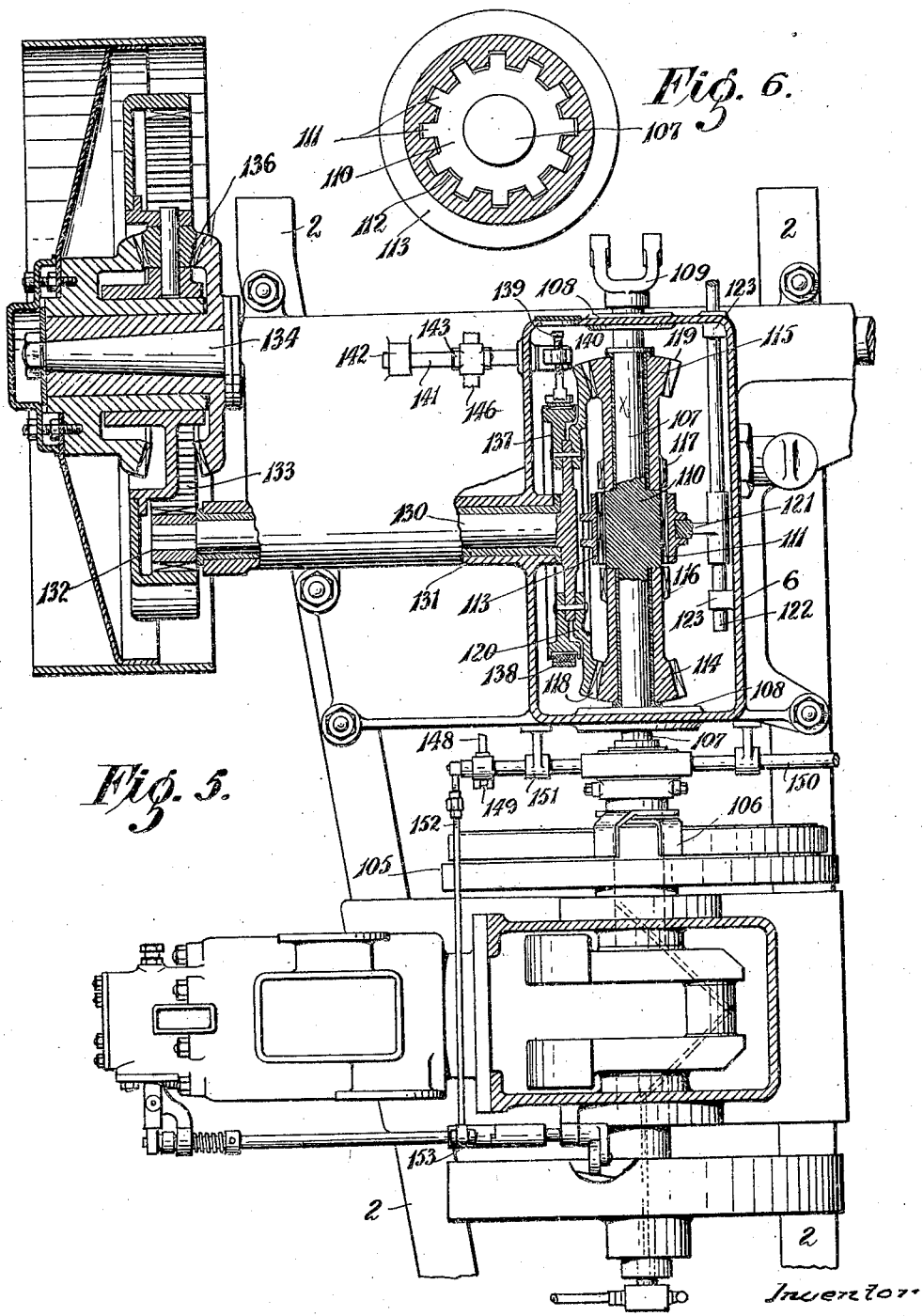

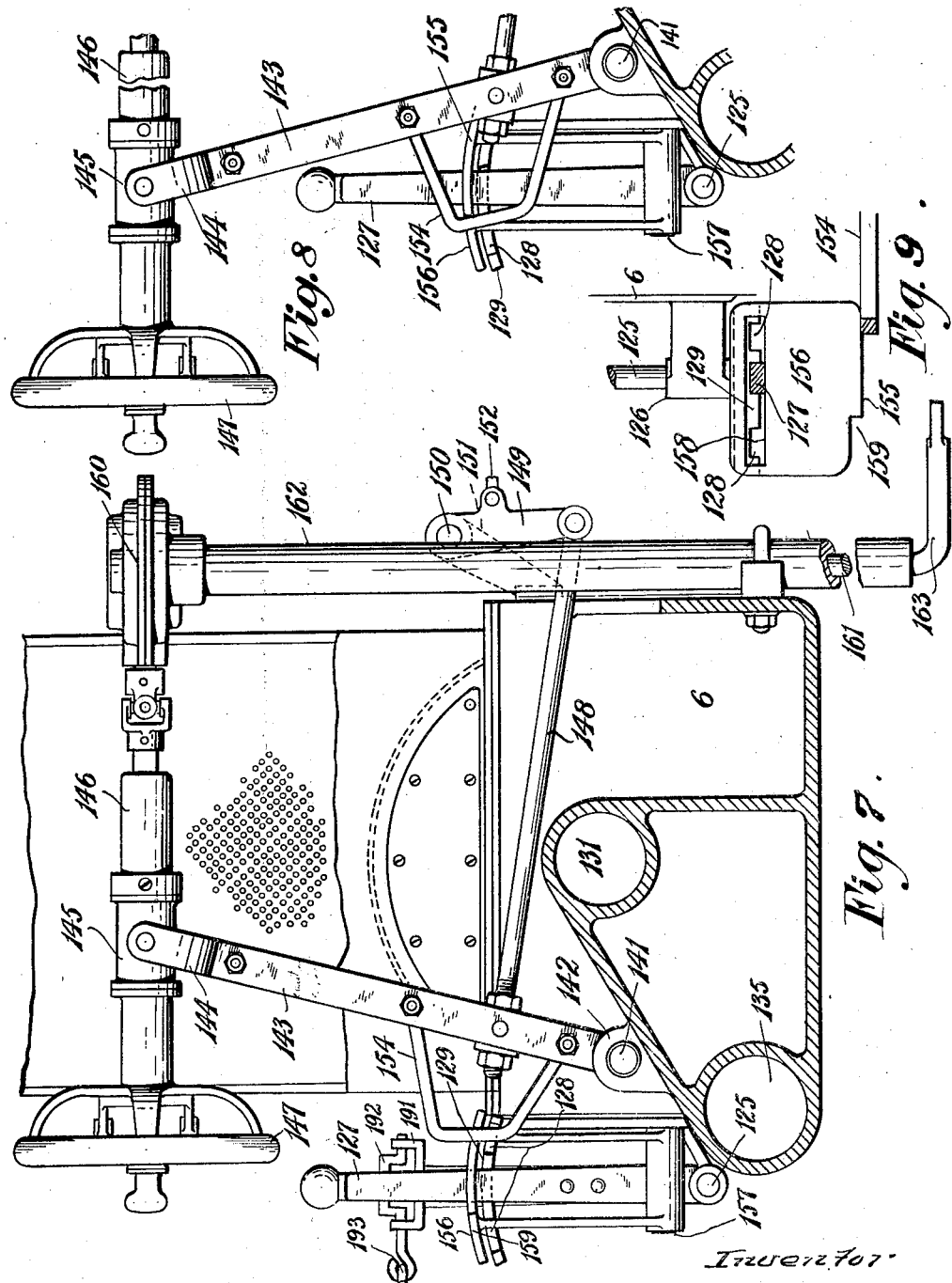

Aug. 23, 1932.                C. MURNANE                1,873,458
                              FARM TRACTOR
                   Original Filed April 3, 1928    8 Sheets-Sheet 6

Inventor
C. Murnane
By [signature]
Atty

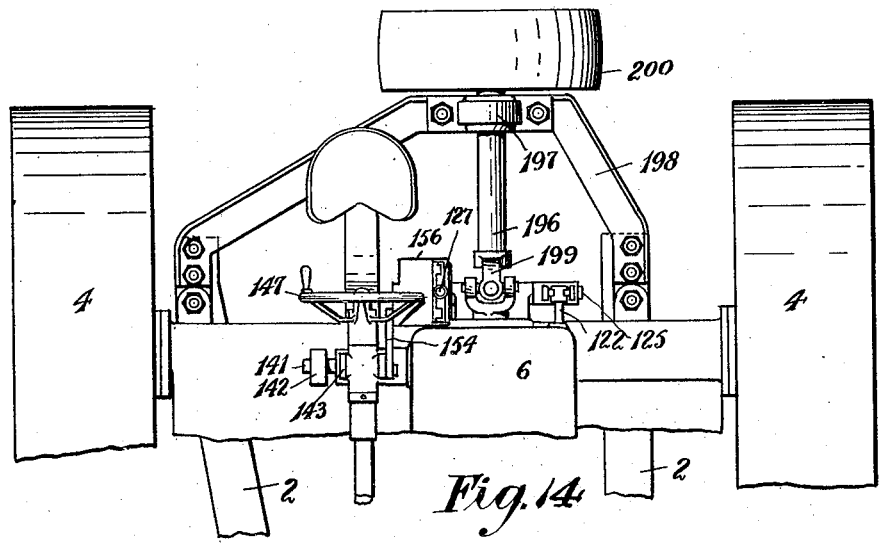
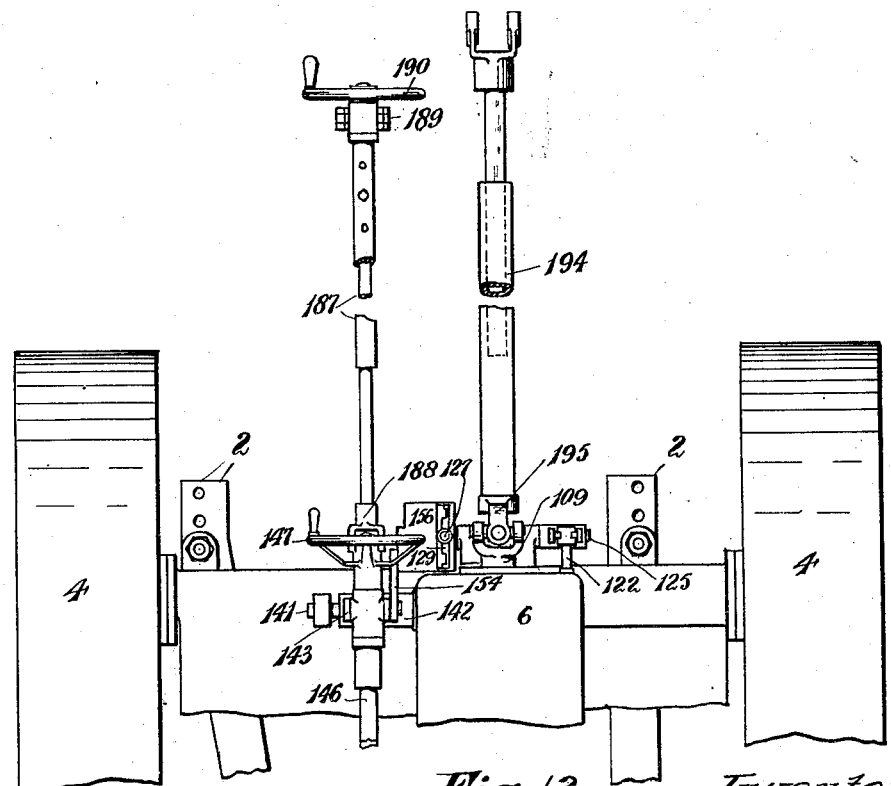

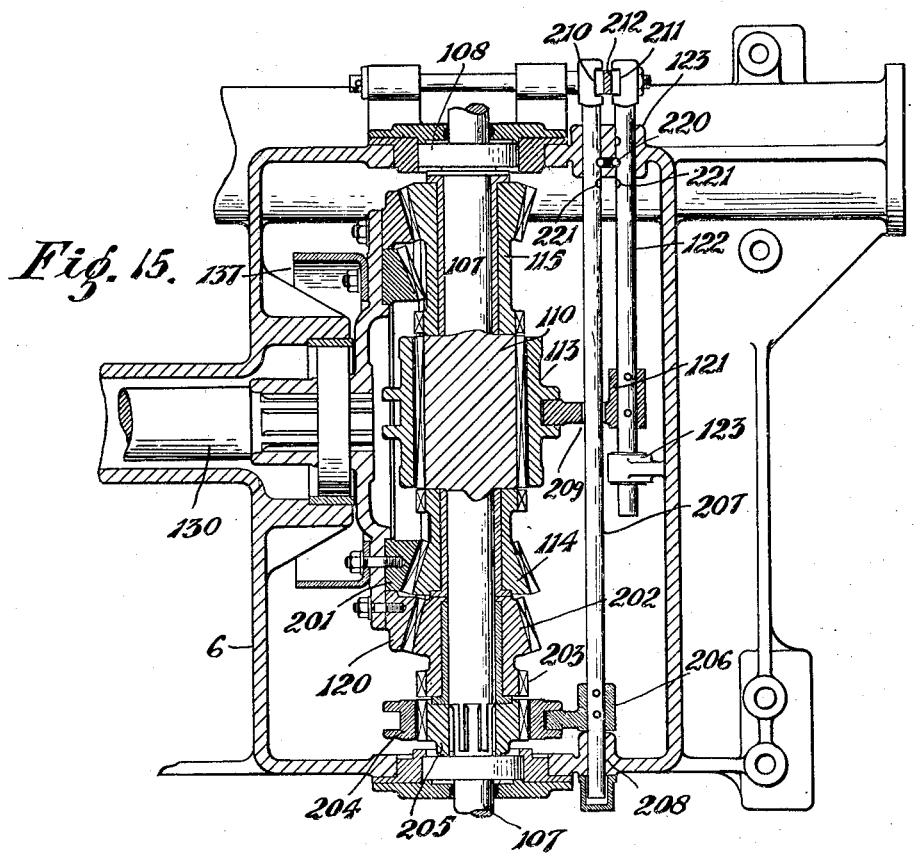
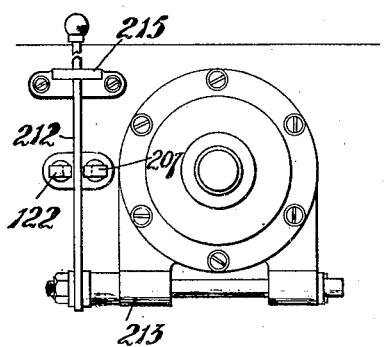
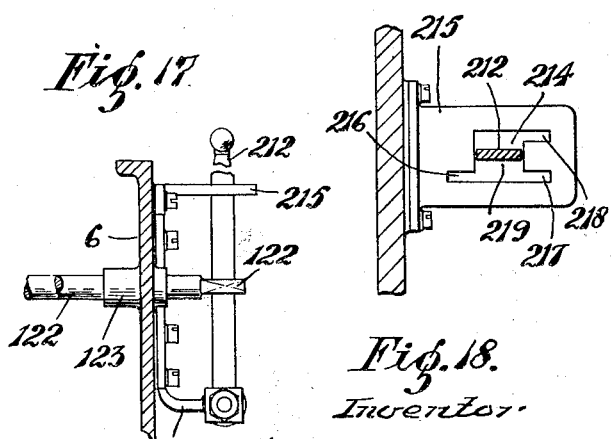

Patented Aug. 23, 1932

1,873,458

UNITED STATES PATENT OFFICE

CORNELIUS MURNANE, OF MELBOURNE, VICTORIA, AUSTRALIA, ASSIGNOR OF ONE-HALF TO THOMPSONS ENGINEERING & PIPE COMPANY LIMITED, OF CASTLEMAINE, VICTORIA, AUSTRALIA

FARM TRACTOR

Application filed April 3, 1928, Serial No. 267,073, and in Australia April 26, 1927. Renewed March 25, 1932.

This invention relates to an improved farm tractor of the four-wheeled type adapted for hauling and driving agricultural implements or machines and for use in power farming generally.

Principal features of the invention comprise an improved chassis construction and general assembly of parts whereby the engine, gear box and transmission mechanism are rendered conveniently accessible for overhaul and inspection: an improved two-stroke Diesel engine of balanced construction having improved fuel injection means and automatic governing arrangements: a simplified transmission gear providing a forward drive, a reverse drive and a direct take-off drive: a combination hand control member for steering the tractor and also for controlling the engine clutch, the brake, and the fuel injection to the engine: and a safety interlocking connection of simple character between the gear-shift lever and said combination hand control member whereby said gear-shift lever can be manipulated only when the engine clutch is disengaged.

Further important features consist of an improved shock-absorbing draw bar adapted to automatically disconnect the power transmission to the traction wheels under conditions of excessive resistance: and improved extension control means whereby the tractor may be conveniently driven and controlled from a harvester or other trailing machine.

Other constructional features are embodied in the invention and are hereinafter fully described. Referring now to the accompanying drawings:—

Figure 2 is a plan view partly in section of the tractor showing the chassis construction and the general assembly of the engine, the transmission gear, the gear box and the controls.

Figure 5 is a sectional plan view which illustrates the transmission gear, the gear box and the differential mechanism of the rear traction wheels.

Figure 6 is a sectional detail view of a sliding clutch member in the gear box.

Figure 7 illustrates in side elevation the various tractor controls and the safety means for interlocking said controls while the engine clutch is engaged.

Figure 8 is a similar view of the tractor controls but showing the safety interlocking means in released position when the engine clutch is disengaged.

Figure 9 is a detail plan view of the safety interlocking means.

Figure 13 is a plan showing the improved extension control means and the means for transmitting driving power from the tractor to trailing machines.

Figure 14 is a plan view showing a power transmission pulley mounted at the rear end of the tractor for transmitting power to stationary machines.

Figure 15 is a sectional view of a modified form of transmission gear providing two forward speeds.

Figure 16 is a rear end view showing the gear shift lever.

Figure 17 is a sectional view of Figure 16.

Figure 18 is a plan view of the gate for the gear shift lever.

Figure 1:
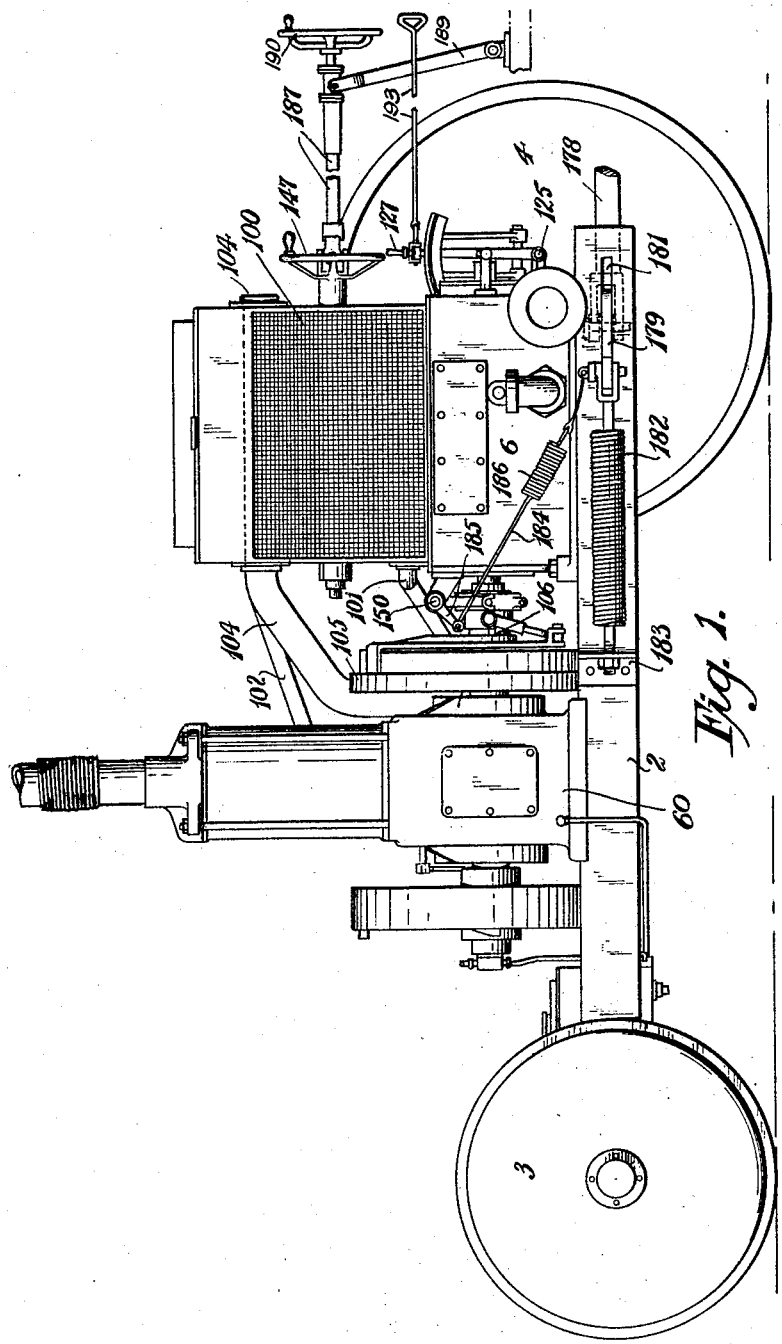
Figure 1 is a view in side elevation of the improved farm tractor, one of the rear traction wheels being removed for convenience of illustration.
Figure 4:
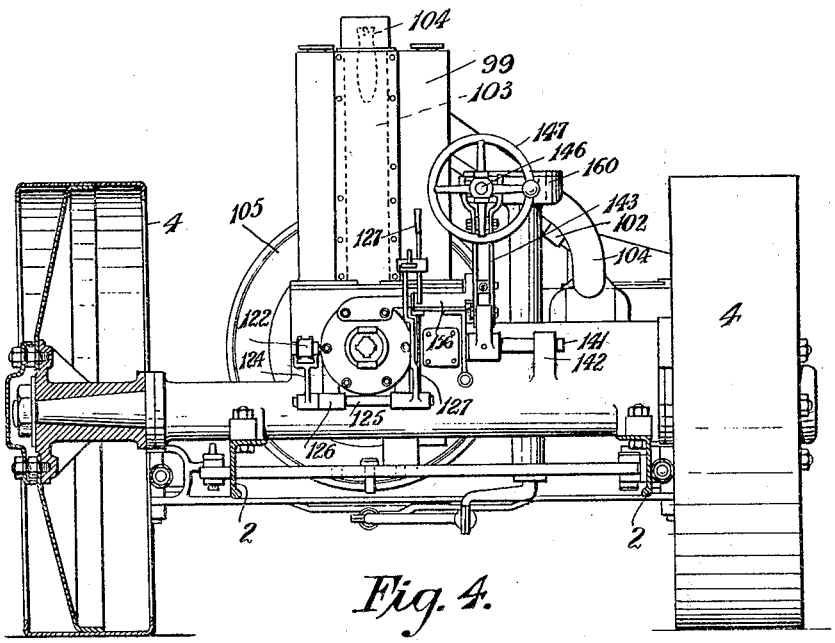
Figure 4 is a rear end view of the tractor.
Figure 3:
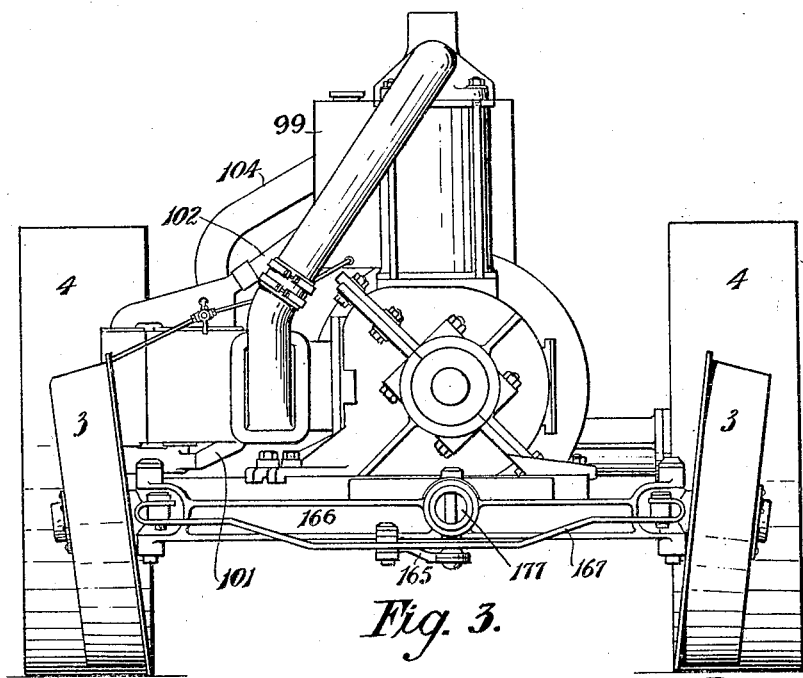
Figure 3 is a front end view of the tractor.

The tractor has its main frame or chassis 2 constructed from one piece of channel or angle-section metal bent to substantially U-shape with its curved portion disposed at the forward end of the tractor and its end portions located at the rear end of the same. This frame mounted upon front steeering wheels 3 and rear traction wheels 4 supports the engine 5 and the transmission casting 6, both of which are detachably bolted thereto and arranged so as to be conveniently accessible for inspection, cleaning, and overhaul.

The fuel tank 99 of the tractor may be combined with the radiator 100 and the fuel oil circulated through the cooling jackets to cool the engine and at the same time preheat and thin the fuel oil. A suitable pump (not shown) may be provided to deliver the fuel oil through the pipe 101 to the engine cooling jackets and to return it to the tank through a return pipe 102. An air space 103 is provided centrally through the radiator and fuel tank for the passage of cooling air and a pipe 104 leads from the exhaust of the engine to the end of said space 103 to suctionally draw a current of air therethrough.

Mounted on the rear end of the engine crankshaft is a flywheel 105 of stepped construction whereon a clutch 106 of the contracting band type operates. This clutch is connected to a power transmission shaft 107 journaled in bearings 108 in the transmission casing 6 and having its rear end projecting from said casing to provide a direct power take-off drive 109 to a harvester or other trailing machine. The transmission shaft 107 has an enlarged central portion 110 formed with longitudinal gear teeth 111 which are constantly in mesh with the internal teeth 112 of a slidable clutch member 113—shown particularly in Figure 6.

Loosely mounted on the transmission shaft 107 at opposite sides of the toothed portion 111 are pinions 114 and 115 respectively, the pinion 114 providing a forward drive and the pinion 115 a reverse drive. The pinions have at their inner ends teeth 116 and 117, respectively, to mesh with the clutch member 113, and at their outer ends said pinions have teeth 118 and 119 respectively, meshing with a bevel crown wheel 120.

The slidable clutch member 113 is rotatably connected to a forked arm 121 secured to a spindle 122 slidable in bearings 123 in the transmission casing 6. The outer end of said spindle 122 extends through the rear wall of the casing 6 and is pivotally connected to a lever 124 mounted on a shaft 125 journaled in bearings 126. A gear shift lever 127 formed of spring metal is attached to said shaft 125 and is adapted to engage notches 128 formed in a gate plate 129.

In actuating the gear shift lever 127, it is first sprung sidewise out of its engaged notch 128 and then moved in desired direction. By moving it to the forward position, the spindle 122 is actuated and slidably moves the clutch member 113 forwardly so that it engages the teeth 111 of the transmission shaft 107 and also the teeth 116 of the pinion 114. A forward drive is thus transmitted to the traction wheels 4 through the teeth 118 and the crown bevel wheel 120.

By moving said gear shift lever to the rear position, the clutch member 113 is moved rearwardly to engage the teeth 117 of the pinion 115. A reverse drive is thus transmitted to the traction wheels through the teeth 119 and the crown bevel wheel 120.

When the gear shift lever is moved to the central position, the clutch member 113 does not engage either the pinion 114 or the pinion 115, and as no driving power is transmitted to the traction wheels 4 the tractor remains stationary. The power take-off end 109 of the transmission shaft is, however, rotated enabling the tractor to be used as a stationary engine for driving chaff-cutters, saw benches or other machines.

The bevel crown wheel 120 is secured to a bull pinion shaft 130 arranged transversely of the tractor and journaled in a bearing boss 131 formed in the transmission casing 6. Provided on the outer end of said transverse shaft 130 is a bull pinion 132 meshing with an internal bull gear 133 for driving the rear axle 134. Said rear axle journaled in bearings 135 in the casing 6 and is adapted to transmit tractive power to both traction wheels 4 through differential mechanism 136 of usual type, see Figure 5.

Secured to the bevel crown wheel 120 is a brake drum 137 fitted with an external contracting brake band 138. The ends of said brake band are connected by adjusting screws 139 to a double-crank bracket 140 fitted on a transverse shaft 141 journaled in bearings 142 on the transmission casing 6. Connected to the outer end of said shaft 141 is a lever 143 which is bifurcated at its upper end 144 to pivotally receive a sleeve 145. This sleeve is loosely mounted on a horizontal steering shaft 146 of telescopic construction and having at its outer end a vertical hand control wheel 147, see Figure 7. By exerting a rearward pull on the wheel 147, the lever 143, is actuated and partially rotates the shaft 141, thereby causing the brake band 138 to be contracted on the brake drum 137 of the crown wheel.

A rod 148 is secured to the lever 143 and is connected at its forward end to a bellcrank lever 149 fixed on a shaft 150 journaled in bearings 151 at the forward end of the transmission casing 6. The shaft 150 is connected to the engine clutch 106 in such manner that when said lever 143 is pulled rearwardly the engine clutch is disengaged and the brake applied. Pivoted to the bellcrank lever 149 is a rod 152 connected to a sleeve 153 on the rocking shaft of the fuel injection pump. The function of this connection is to reduce the stroke of the fuel pump when the engine clutch is disengaged thereby preventing racing of the engine.

The control lever 143 is interconnected with the gear shift lever 127 so that the latter can be actuated only when the engine clutch is disengaged and said control lever is in its rearward position. A curved bar 154 secured to said control lever is adapted to engage the outer edge 155 of a plate member 156 pivotally mounted at its lower end on a pivot 157. Said plate member is formed with a slotway 158 to accommodate the gear shift lever 127 and its edge 155 is formed at its rear end with a recess or gap 159.

When the control lever 143 is in the forward position with the engine clutch engaged, the curved bar 154 contacts with the edge 155 of the plate 156 and forces the slotway 158 of said plate firmly against the gear shift lever 127, thus rigidly locking said gear shift lever within one of the locking notches 128, as shown in Figures 7 and 9. By this means the gear shift lever 127 cannot be actuated to slidably move the clutch member 113 when the engine clutch is engaged.

When the control lever 143 is moved rearwardly to the position shown in Figure 8 to disengage the engine clutch, the curved bar 154 engages the gap 159 in the plate 156 thereby releasing said plate so that the gear shift lever can be withdrawn out of the notch 128 and moved in desired direction. Should the gear shift lever 127 at any time be left in a position midway of the notches 128, the control lever 143 cannot be moved forwardly to engage the engine clutch until said gear shift lever is first brought into engagement with one of the said notches.

The steering of the tractor is controlled by the telescopic shaft 146 which is connected through worm gearing in a casing 160 to a vertical rod 161 rotatably mounted in a bearing column 162 secured to the front wall of the transmission casing 6. The lower end of said rod 161 has an arm 163 which is connected by a link bar 164 to one end of a bell-crank lever 165 pivoted on the front axle 166 of the tractor. The other end of said bell-crank lever is pivoted to a transverse steering bar 167 arranged parallel to the axle 166 and pivotally connected at its end to steering arms 168 secured to stub axles 169. The stub axles are pivotally mounted on bolts 170 fitted through jaws 171 formed at the ends of the front axle.

Figure 11:
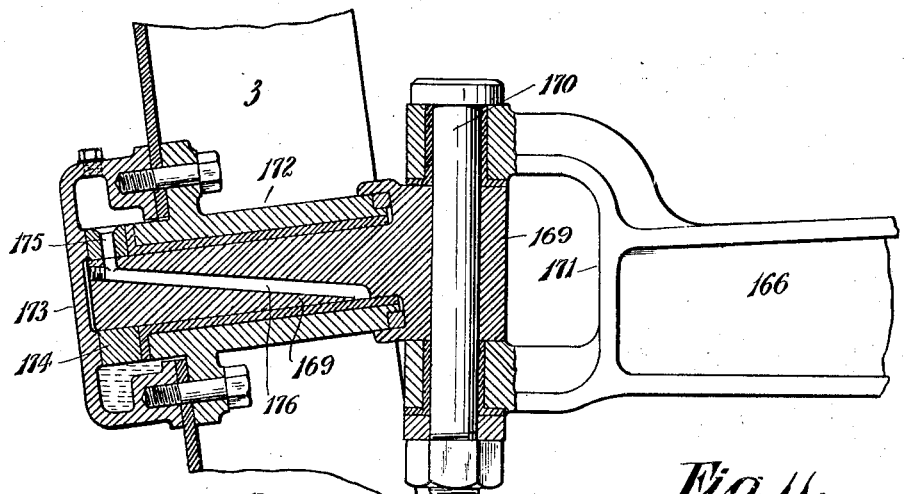
Figure 11 is a sectional detail view showing the mounting of the front steering wheels of the tractor and the associated lubricating means.
Figure 12:
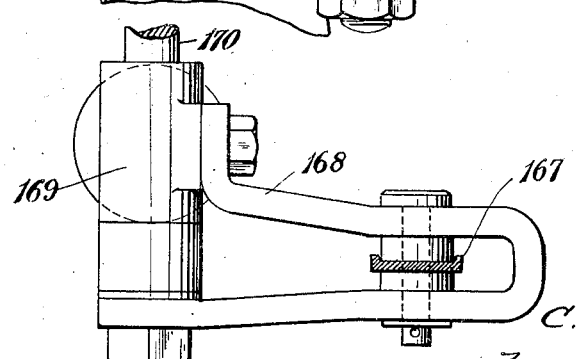
Figure 12 is a detail view of one of the steering arms of the front wheels.

The front steering wheels 3 are preferably constructed from pressed steel, each having a sleeve hub 172 revolvable on the stub axle 169 and maintained thereon by a cap 173 and thrust collar 174. The cap 173 contains lubricant elevated during the rotation of the wheel and gravitationally fed to the wheel bearing through a port 175 in the thrust collar and through a passage 176 formed diagonally in the stub axle, see Figure 11.

The front axle 166 is mounted on a trunnion or pintle bearing 177 carried from the forward end of the chassis frame 2 whereby the front wheels 3 are capable of limited swinging movement relative to the tractor chassis. The bell-crank steering lever 165 of the front wheels is preferably arranged directly beneath the vertical centre of said trunnion bearing 177 so that the steering connections are not affected by the swinging movements of the wheels.

Figure 10:
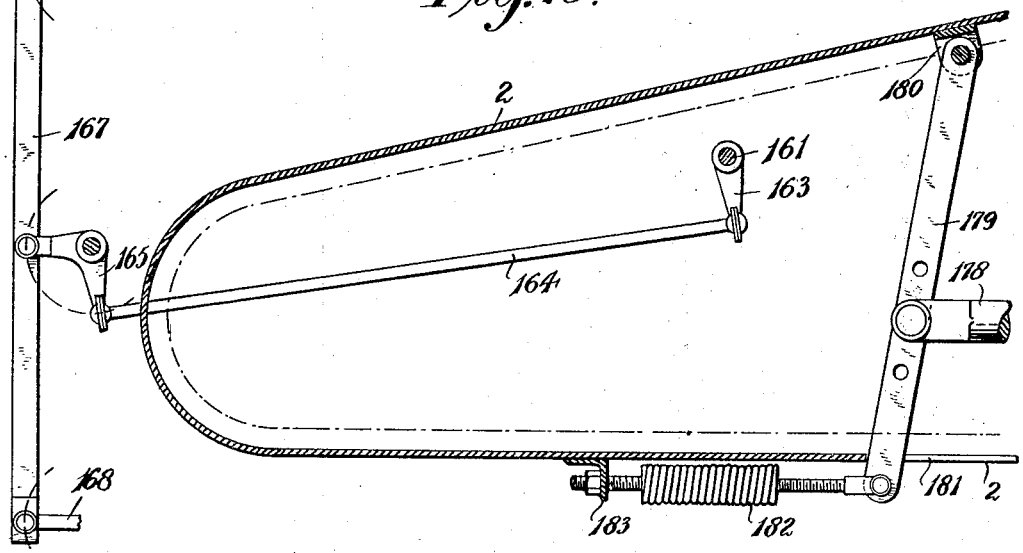
Figure 10 is a plan illustrating the steering arrangement of the tractor and the shock-absorbing draw-bar.

The tractor is provided with a shock-absorbing draw-bar 178 which is pivotally attached to a transverse bar 179 pivoted at one end to a bracket 180 secured to the chassis frame 2. The opposite end of said transverse bar 179 passes through a guide slot 181 formed in the side of the chassis frame and it is coupled to a coil spring 182 adjustably connected to an angle bracket 183 on the side of the chassis 2, see Figure 10. The pivoted bar 179 is connected by a chain or cable 184 to a crank arm 185 fitted to the end of the engine clutch shaft 150. A coiled expansion spring 186 is provided in the chain or cable 184 to prevent shock to the driver's hand when the hand wheel 147 is suddenly moved rearwardly through the automatic release of the engine clutch by the draw-bar.

The coiled spring 182 of the draw-bar absorbs minor shocks imparted to the tractor and thus prevents excessive strains being imposed on the transmission gearing. Should the trailing implement contact with a stump or large obstacle, or should the tractive resistance from any other cause become abnormal, the excessive pull on the draw-bar will actuate the chain or cable 184 causing the engine clutch to be disengaged, and stoppage of the travel of the tractor.

The improved extension control means, illustrated in Figure 13, comprises an adjustable rod 187 connected through a universal coupling 188 to the tractor steering shaft 146. The rear end of said rod is supported in a swinging bracket 189 mounted on the frame of the trailing implement or machine, and it has a hand control wheel 190 similar to the control wheel 147, whereby the tractor may be steered and controlled from the trailing implement.

The gear shift lever 127 carries a bracket 191 revolvably supporting a small crank 192, which when rotated contacts with said gear shift lever and disengages it from the locking notches 128. An extension rod 193 provided with a loop handle is swivelly attached to said crank 192 and extends rearwardly to the trailing implement so that the gear shift lever 127 can be actuated therefrom.

It will be observed that with the improved extension controls the driver on the trailing implement can efficiently control the tractor with one hand leaving his other hand free to manipulate the various controls of the trailing machine.

When the tractor is used for hauling harvesters or like machines, a power transmission shaft 194 of telescopic construction is coupled by a universal coupling 195 to the power take-off end 109 of the shaft 107 and is connected to the harvester to drive its various working parts.

To enable the power of the tractor to be utilized for driving stationary belt-driven machines such as circular saws or chaff-cutters, a short tail shaft 196 is mounted in a bearing 197 carried by an extension frame 198 at the rear of the tractor and is connected by a universal coupling 199 to the power take-off end 109 of the transmission shaft 107. A pulley wheel 200 is mounted on the end of said tail shaft and receives a belt (not shown) for driving the stationary machine.

In the modified form of transmission gear illustrated in Figures 15 to 18, a two speed forward drive is provided in addition to the reverse drive and power take-off drive. According to this construction an inner ring 201 is provided on the bevel crown wheel 120 and the loose pinion 114 is shortened to mesh with said inner ring. The bevel crown wheel meshes with the pinion 115 and also with an additional pinion 202 loosely fitted on the transmission shaft 107 at a point in advance of the pinion 114.

The pinion 202 has at its outer end teeth 203 engageable with a sliding clutch member 204 which is constantly in mesh with a driving pinion 205 fitted on the transmission shaft. The clutch member 204 is actuated by a forked arm 206 secured to a spindle 207 which is slidable in bearings 208 in the gear case. Said spindle 207 is arranged parallel to the spindle 122 controlling the clutch member 113, and preferably it passes through a slotway 209 formed in the forked operating arm 121 of said clutch member.

The rear ends of the two spindles 122 and 207 extend through the rear wall of the gear case and are formed with gaps 210 and 211, respectively, adapted to receive a gear shift lever 212. The lower end of the gear shift lever is pivoted to a suitable bracket 213 while its upper end operates within an opening 214 in a gate plate 215. The opening 214 has a forward notch 216, two rear notches 217 and 218 and a central portion 219.

When the gear shift lever is accommodated in the central portion 219 of the gate plate as shown in Figure 18 it is in neutral position and is out of engagement with both of the gaps 210 and 211 in the clutch spindles. Both of the clutch members 113 and 204 are thus maintained in neutral position so that no driving power is transmitted to the traction wheels 4.

If the gear shift lever is moved forwardly into the notch 216, it engages the gap 211 in the clutch spindle 122 and moves the sliding clutch member 213 into engagement with the pinion 114. A top speed forward drive is thus transmitted to the traction wheels through the pinion 114 and the inner ring 201 of the crown wheel.

When the gear shift lever is moved rearwardly into the notch 217, the spindle 122 is actuated to move the clutch member 113 into engagement with the pinion 115. A reverse drive is thus transmitted to the traction wheels through the crown bevel wheel 120.

By moving the gear shift lever through the central portion 219 of the gate into the notch 218, said gear shift lever is disengaged from the gap 211 in the clutch spindle 122 and is engaged with the gap 210 in the second clutch spindle 207. Said clutch spindle 207 is thus slidably moved rearwardly, causing the sliding clutch member 204 to be moved into mesh with the teeth 203 of the pinion 202. A low speed forward drive is thus transmitted to the traction wheels through said pinion 202 and the bevel crown wheel 120.

To retain the slidable clutch spindles 122 and 207 in their various positions, spring pressed balls 220 may be provided in the bearing 123 and be arranged to engage recesses 221 formed in the surfaces of the spindles.

What I do claim is:—

1. In a farm tractor, the combination of a chassis frame mounted on front steering wheels and rear traction wheels, a power unit, transmission gearing connected to the traction wheels, an engine clutch between the power unit and the transmission gearing, a control member rotatable to govern the steering wheels and mounted for sliding movement, a lever operated in the sliding movement of the control member, means operated in the movement of the lever to actuate the engine clutch, and means actuated in the movement of the lever to govern the control of the transmission gearing.

2. In a farm tractor, the combination of a chassis frame mounted on front steering wheels and rear traction wheels, an engine having a fueling system, transmission gearing connected to the traction wheels, an engine clutch between the power unit and the transmission gearing, a brake, a control member rotatable to govern the steering wheels of the tractor and mounted for sliding movement, a lever operated in the sliding movement of the control member, and means operated by the lever to control the engine clutch and the fuel supply to the engine, said means operating to diminish the fuel supply as the clutch is disengaged to thereby prevent racing of the engine.

3. In a farm tractor, the combination of a chassis frame mounted on front steering wheels and rear traction wheels, an engine, transmission gearing connected to the traction wheels, an engine clutch between the engine and the transmission gearing, a gear shift lever, a control member rotatable to govern the steering wheels and mounted for sliding movement, a lever actuated in the sliding movement of the control member, means connected to the lever for governing the clutch, and means carried by the lever to prevent movement of the gear shift when the control member is in position to hold the clutch engaged.

4. In a farm tractor, the combination of a chassis frame mounted on front steering wheels and rear traction wheels, a power unit, transmission gearing connected to the traction wheels, an engine clutch between the power unit and the transmission gearing, a clutch control lever connected to the engine clutch, a steering shaft, a hand member for actuating both said steering shaft and said clutch lever, a gear shift lever adapted to engage a notched plate, a loosely pivoted locking member engaging the gear shift lever, and a member on the clutch control lever adapted when the engine clutch is engaged to press said pivoted locking member against the gear shift and hold it in locked position in the notched plate, and also adapted when the engine clutch is released to engage a recess in said rocking member to thereby release the gear shift lever.

5. In a farm tractor, the combination of a chassis frame mounted on front steering wheels and rear traction wheels, a power unit, transmission gearing connected to the traction wheels, an engine clutch between the power unit and the transmission gearing, a brake, a brake shaft, a clutch control lever connected to said brake and connected to the engine clutch, a pivoted lever connected to said clutch control lever, a steering shaft, means carried by said pivoted lever rotatably supporting said steering shaft, and a hand member for actuating both the steering shaft and said clutch control lever.

6. In a farm tractor, the combination of a chassis frame mounted on front steering wheels and rear traction wheels, a power unit, transmission gearing connected to the traction wheels, an engine clutch between the power unit and the transmission gearing, a gear shift lever adapted to engage a notched plate, a combination control member rotatable to move the steering wheels, said control member being mounted for sliding movement, an element operated in the sliding movement of the control member, a connection between said element and the engine clutch, an adjustable extension shaft connected to said combination control member for operating it from a trailing machine, an extension rod connected to the gear shift lever and a crank connected to said extension rod whereby said gear shift lever can be released from said notched plate.

7. In a farm tractor, a frame, front steering wheels therefor, rear traction wheels therefor, an engine, transmission gearing, a clutch between the engine and transmission gearing, a gear shift lever for controlling the transmission gearing, a control member mounted for rotating movement to control the front steering wheels and for sliding movement, an element connected to said control member and operated by the sliding movement thereof, a connection from said element to the clutch whereby in the sliding movement of the control member the clutch may be engaged and disengaged, a plate for locking the gear shift lever against operation, and means on the element for maintaining the plate in position to lock the gear shift lever against operation when the element is in position to maintain the clutch engaged.

8. In a farm tractor, the combination of a frame, front steering wheels therefor, rear traction wheels therefor, an engine, a fuel feeding means for the engine, transmission gearing connected to the traction wheels, an engine clutch between the engine and transmission gearing, a gear shift lever, a control member mounted for rotation for governing the steering wheels, said control member being capable of sliding movement, an element connected to and operated by the sliding movement of the control member, means intermediate said element and the clutch to control the clutch in the movement of the element, said means including mechanism for simultaneously governing the fuel feed to the engine, and means controlled by the element for locking the gear shift lever against operation when the element has been operated to engage the clutch.

In testimony whereof I affix my signature.

CORNELIUS MURNANE.